United States Patent [19]

Schlecht et al.

[11] Patent Number: 5,151,287

[45] Date of Patent: Sep. 29, 1992

[54] PROCESS FOR INCREASING COFFEE EXTRACTION YIELD

[75] Inventors: Klaus Schlecht; Olaf Wehrspann, both of Orbe, Switzerland

[73] Assignee: Nestec S.A., Vevey, Switzerland

[21] Appl. No.: 688,054

[22] Filed: Apr. 19, 1991

[30] Foreign Application Priority Data

May 7, 1990 [EP] European Pat. Off. ........ 90108583.7

[51] Int. Cl.[5] .............................................. A23F 5/26
[52] U.S. Cl. ..................... 426/432; 426/434
[58] Field of Search ................. 426/432, 434

[56] References Cited

U.S. PATENT DOCUMENTS

| | | | |
|---|---|---|---|
| 686,689 | 11/1901 | Eschwege | 426/432 |
| 1,393,045 | 10/1921 | Scott | 426/432 X |
| 2,333,027 | 10/1943 | Morgenthaler | 426/432 X |
| 3,035,921 | 5/1962 | Carver et al. | 426/434 X |

OTHER PUBLICATIONS

Sivetz et al, Coffee Technology, 1979, Avi: Westport, Connecticut, pp. 373-379.

*Primary Examiner*—Joseph Golian
*Attorney, Agent, or Firm*—Vogt & O'Donnell

[57] ABSTRACT

Extraction yield of coffee extracted in a countercurrent extraction system is increased by separating sludge by centrifugation from coffee extract obtained from the system and introducing the sludge into at least one extraction cell of the system so that the sludge may be hydrolyzed during the extraction of the coffee.

8 Claims, 1 Drawing Sheet

PROCESS FOR INCREASING COFFEE EXTRACTION YIELD

BACKGROUND OF THE INVENTION

This invention relates to a process and an apparatus for liquid-phase extraction of coffee.

It is known that coffee can be extracted on an industrial scale in the manufacture of instant coffee by passing hot water through cells filled with ground roasted coffee (Sivetz - Coffee Processing Technology, Vol. 1, pages 262-263, AVI, 1963).

Extraction is carried out in countercurrent, i.e., the hot water under pressure at a temperature of 150° to 180° C. is introduced into the cell containing the batch of ground roasted coffee which has been most intensively extracted (having undergone N extractions), generally at the bottom of the cell. The liquid extract of this extraction cell is then passed through the extraction cell containing the batch of coffee which has been extracted (N−1) times and so on until the liquid extract passes through the cell which has just been filled with fresh ground roasted coffee.

The final extract leaves this last cell at a temperature of the order of 100° C.

The most intensively extracted coffee is thus subjected to the highest temperature while the fresh coffee is subjected to the lowest temperature.

A distinction is normally drawn between the hot cells, which contain the most intensively extracted coffee, and the cold cells which contain the least intensively extracted coffee.

After each extraction cycle, the cell containing the most intensively extracted coffee is emptied, filled with fresh coffee and, after the cells have been suitably interconnected, another extraction cycle begins.

Although the final extract obtained at the exit of the extraction cell containing the freshest coffee contains only a small quantity of ground coffee particles, fines still being entrained, it is desirable to filter the extract.

Finally, after the filtration phase which eliminates the particles larger than about 1 mm in size, solids, such as polysaccharides, are still present in suspension and are best eliminated to enable a coffee powder which dissolves perfectly without any solids appearing in the cup to be obtained after concentration and freeze-drying or spray-drying of the extract.

The suspended solids are normally eliminated by centrifugation, the sludge obtained then being decanted, the supernatant decantation liquid being reintroduced into the final filtered extract while the solid residue obtained is eliminated.

The main disadvantage of this process is that it produces a sludge which has to be retreated by decantation and which is not easy to handle.

Accordingly, the problem addressed by the present invention was to provide a process for the liquid-phase extraction of coffee which would overcome this disadvantage.

SUMMARY OF THE INVENTION

Accordingly, the present invention relates to a process for the liquid-phase extraction of coffee in which an extraction liquid is passed in countercurrent through extraction cells containing ground roasted coffee, the final extract being centrifuged, characterized in that the sludge obtained by the centrifugation step is reintroduced into at least one extraction cell.

The reintroduction of the sludge produced by the centrifugation step makes the sludge much easier to handle.

The present invention also relates to an apparatus comprising extraction cells for carrying out the process according to the invention, characterized in that a filtration unit extended by a centrifugation unit comprising a pipe for removing the purified liquid and a circuit for recycling the centrifugation sludge to the extraction cells is provided at the exit of the last extraction cell.

Other features and advantages will become apparent from the following description in conjunction with the accompanying drawing.

BRIEF DESCRIPTION OF THE DRAWING

The Drawing FIGURE diagrammatically illustrates an example of embodiment of the apparatus for carrying out the process according to the invention.

DETAILED DESCRIPTION OF THE DRAWING FIGURE

Figure 1:
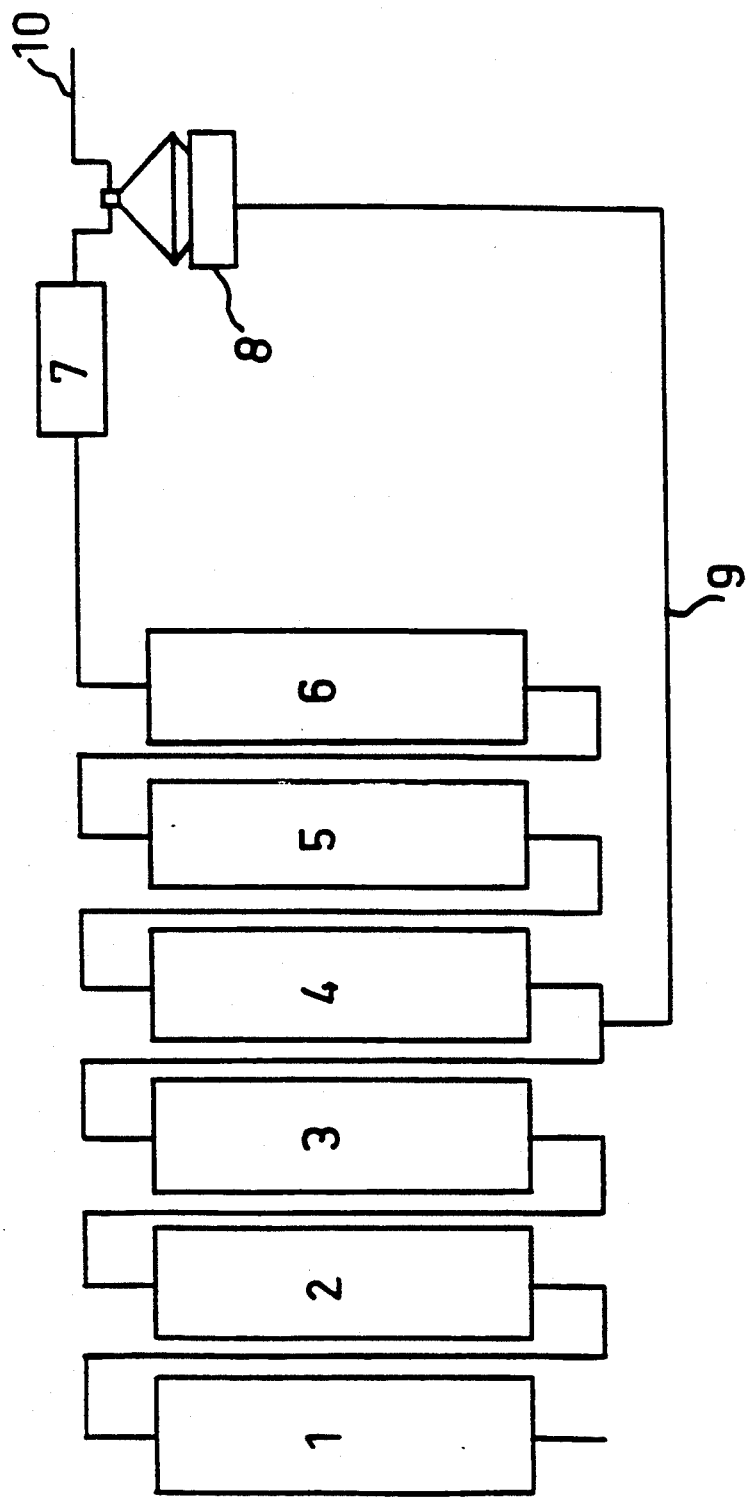

Referring to the drawing, a coffee extraction apparatus comprises several extraction cells operating in series, of which each consists of a column connected at its lower end to the upper end of the preceding column and at its upper end to the lower end of the following column.

The extraction apparatus generally comprises four to eight extraction cells and preferably six extraction cells.

Cell 1 contains the most intensively extracted coffee while cell 6 contains the freshest coffee, the extraction level decreasing from cell 1 to cell 6.

The extraction liquid, which consists of water under pressure at a temperature of 150° to 180° C., arrives at the bottom of the cell, passes upwards through the cell, picking up soluble product in the process, exits at the upper end of the cell 1 and passes successively through each of the cells until it passes through the cell 6 which is the last cell and which contains fresh ground roasted coffee.

The final extract at the exit of the cell 6 is passed through a filtration unit 7 for removing the suspended particles which have been entrained and of which the smallest is larger than about 1 mm in size.

An apparent yield, "Y app.", is then determined, corresponding to the percentage solids in the final filtered extract in relation to the dry solids in the cell 6 containing the fresh coffee.

The solids still suspended in the final extract then have to be removed. To this end, the final extract is centrifuged in a centrifuge 8.

In the known process, the sludge produced by the centrifugation step was simply decanted, the supernatant consisting of soluble materials then being reintroduced into the filtered final extract while the slurry was simply eliminated.

The actual yield, T actual, of this process is thus equal to Y app. - Y sludges, Y sludges representing the insoluble fraction present in the sludges after decantation and the residual soluble fraction still present in the sludges.

In the process according to the invention, the sludge produced by centrifugation is reintroduced into the extraction cells.

A circuit 9 for recycling the centrifugation sludge is thus provided between the centrifuge 8 and the extraction cells, the purified liquid produced by centrifugation being removed through a pipe 10 and then subjected to a conventional treatment to produce soluble coffee powder.

The soluble solids are thus entrained by the flow of extract to the final extract while the insoluble solids are retained on the bed of coffee in the extraction cells and transported into the hot cells where they are partly hydrolyzed and thus solubilized.

The centrifugation product is preferably reintroduced at the level of the separation between two groups of cells, the hot cells, in which the extraction liquid has a temperature sufficient to hydrolyze the coffee, and the cold cells, i.e., between the extraction cell 3 and the extraction cell 4.

Accordingly, since the centrifugation product is introduced into the cold cell which immediately follows the last hot cell during the cycle following extraction, the centrifugation product is situated in the first hot cell.

To ensure that the cold cells are not unnecessarily charged with insoluble, but hydrolyzable products, the sludges are preferably introduced directly into the cells where they will be effectively hydrolyzed.

Accordingly, there is effectively an increase in the actual extraction, i.e. as measured after centrifugation.

Thus, for a starting extraction temperature of 174° C. and a temperature of the last cold cell of 104° C. and for a sludge recirculation rate of 420 kg per hour with 2,000 kg roasted coffee treated per hour, all other conditions being equal, tests have shown a distinct increase in the actual extraction of the order of 1% which, in this industrial sector, must be considered significant.

Thus, by reintroducing the centrifugation sludges into the extraction cycle, the problem of handling these sludges is solved on the one hand while the yield of the extraction process is considerably increased on the other hand.

We claim:

1. A process for extracting roast and ground coffee comprising introducing an extraction liquid having a temperature sufficient to hydrolyze roast and ground coffee into a countercurrent extraction system comprising a plurality of extraction cells interconnected in series and passing the extraction liquid through roast and ground coffee contained in the cells to extract the coffee to obtain an extract from the system, centrifuging the extract to separate solids suspended in the extract from the extract to obtain a sludge and then introducing the sludge into at traction cell to hydrolyze the sludge by means of the extraction liquid during extraction.

2. A process according to claim 1 wherein the extraction liquid introduced into the extraction system is water which has a temperature of from 150° C. to 180° C.

3. A process according to claim 1 wherein the plurality of extraction cells comprise two groups of cells, wherein the extraction liquid is introduced into a cell of a first group, and wherein the sludge is introduced into a cell of the first group.

4. A process according to claim 2 wherein the plurality of extraction cells comprise two groups of cells, wherein the water is introduced into a cell of a first group, and wherein the sludge is introduced into a cell of the first group.

5. A process according to claim 1 wherein the plurality of extraction cells comprise two groups of cells, wherein the extraction liquid is introduced into a cell of a first group, and wherein the sludge is introduced into a second group cell which is adjacent in series to a cell of the first group.

6. A process according to claim 2 wherein the plurality of extraction cells comprise two groups of cells, wherein the water is introduced into a cell of a first group, and wherein the sludge is introduced into a second group cell which is adjacent in series to a cell of the first group.

7. A process according to claim 1 further comprising filtering the extract prior to centrifugation to remove particulate material having a size of larger than about 1 mm and then centrifuging the filtered extract.

8. A process according to claim 2 further comprising filtering the extract prior to centrifugation to remove particulate material having a size of larger than about 1 mm and then centrifuging the filtered extract.

* * * * *

UNITED STATES PATENT AND TRADEMARK OFFICE
CERTIFICATE OF CORRECTION

PATENT NO. : 5,151,287
DATED : September 29, 1992
INVENTOR(S) : Klaus SCHLECHT, et al.

It is certified that error appears in the above-identified patent and that said Letters Patent is hereby corrected as shown below:

Column 4, line 6 [line 11 of claim 1], after "at", insert --least one-- and then change "traction" to --extraction--.

Signed and Sealed this

Fifth Day of October, 1993

Attest:

BRUCE LEHMAN

*Attesting Officer*  *Commissioner of Patents and Trademarks*